US006814210B1

(12) United States Patent
Hendzel (10) Patent No.: US 6,814,210 B1
(45) Date of Patent: Nov. 9, 2004

(54) SELF-STORING MATERIAL SORTATION DEFLECTOR SYSTEM

(75) Inventor: Louis J. Hendzel, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 4 days.

(21) Appl. No.: 10/414,985

(22) Filed: Apr. 16, 2003

(51) Int. Cl.[7] .............................................. B65G 11/00
(52) U.S. Cl. ......................... 193/8; 198/538; 209/900
(58) Field of Search ........................ 271/224; 209/900, 209/655; 193/2 R, 8; 198/538

(56) References Cited

U.S. PATENT DOCUMENTS

| 467,856 | A | * | 1/1892 | Collins ..................... 193/2 R |
| 4,066,158 | A | * | 1/1978 | Hare et al. .................. 193/34 |
| 5,340,099 | A | | 8/1994 | Romanenko et al. |
| 5,340,100 | A | | 8/1994 | Romanenko |
| 5,718,321 | A | | 2/1998 | Brugger et al. |
| 6,050,390 | A | | 4/2000 | Fortenbery et al. |
| 6,523,697 | B1 | * | 2/2003 | Malatesta et al. ........... 209/656 |
| 6,708,742 | B2 | * | 3/2004 | Weathers et al. ........... 141/391 |

2003/0015397 A1 * 1/2003 Coulter ...................... 194/353

* cited by examiner

Primary Examiner—Christopher P. Ellis
Assistant Examiner—Mark A. Deuble
(74) Attorney, Agent, or Firm—Louis J. Franco; Leland D. Schultz; Patrick M. Hogan (57) ABSTRACT

A material deflector plate system adapted for mounting below the forwardly declining surface of a material-guiding discharge chute includes a base frame for mounting rearwardly of the discharge edge of the declining surface and a deflector-plate support structure reciprocably depending from the base frame for reciprocation between rearwardmost and forwardmost positions. Hingedly depending from the support structure are alternatively collapsible and deployable first and second deflector plate sets. The system can alternatively assume storage and operative attitudes. A storage attitude is one in which the deflector plate sets are collapsed and the support structure is disposed sufficiently rearwardly with respect to the base frame that at least a majority of the length of the collapsed deflector plate sets is disposed rearwardly of the chute discharge edge. An operative attitude is one in which the deflector plate sets are in upright positions in which they extend above the chute discharge edge to channel material exiting the chute into a material acceptance region defined to the interior of the deployed deflector plates.

21 Claims, 5 Drawing Sheets

SELF-STORING MATERIAL SORTATION DEFLECTOR SYSTEM

BACKGROUND

1. Field

Although not so limited in its utility or scope, implementations of the present invention are particularly well suited for incorporation in material sortation systems such as those used in moving mail pieces through various stages of processing in a mail processing facility, for example.

2. Brief Description of an Illustrative Environment and Related Art

Material handling operations frequently involve the use of transport systems including networks of conveyor belts, roller conveyors, conduits and chutes. In a typical material sorting environment, a material receptacle is located at each terminus of a selected plurality of termini for the collection of material exiting the sortation system. Commonly, a discharge chute corresponds to a terminus and includes a surface sloped downwardly toward the receptacle for guiding material exiting the sortation system into the receptacle situated below the chute. Illustrative, commonly used, material receptacles include flexible receptacles such as sacks and bags, for example, and rigid receptacles such as boxes, crates, cartons, and carts, for instance.

In a typical package or mail sortation system, multiple, adjacent discharge chutes are arranged along a base structure such as a longitudinally extending main framework adapted for supporting plural chutes. Each chute, and the receptacle corresponding thereto, is typically dedicated to guiding and retaining mail pieces destined for a particular geographical region. Depending on the level of sortation refinement to which a set of chutes and receptacles is dedicated, each chute within the set may be dedicated to mail pieces destined for a particular region of the country, a particular state, a region of a state identifiable by the first three or four digits of a ZIP Code or destination city, for example. A reality of mail sortation systems is that a small percentage of mail pieces exits the sortation apparatus prematurely (i.e., without settling in appropriate receptacles). Of the mail pieces that are unintentionally expelled from the sortation apparatus, a considerable percentage travel as far as the discharge chute and simply miss the receptacle and come to rest on the work area floor, thereby contributing to the "miss sort error" rate of the overall sortation system. For various reasons, sortation protocol in certain sorting facilities requires the reintroduction into the system of unintentionally expelled mail pieces. Consequently, unintentionally expelled mail pieces handled in accordance with the aforementioned protocol must be "double handled" by at least a portion of the mail sorting apparatus. As will be readily appreciated, since a given set of mail sortation apparatus can handle only a finite number of mail pieces per unit time, the "double handling" of mail pieces by any portion of the mail sorting apparatus decreases the efficiency of the overall sortation system.

In response to miss-sort errors in the vicinity of receptacles, sortation facility personnel have resorted to various improvised measures. For instance, it is not uncommon for sortation personnel to raise the front of a receptacle (i.e., the opening edge of the receptacle opposite the exit end of the discharge chute) with the intention of creating a "back stop" for mail pieces that might otherwise overshoot the receptacle. Such measures succeed to a limited extent, but nonetheless require the ad hoc intervention of personnel and, moreover, do not succeed to the same extent that a more permanent solution would.

Accordingly, there exists a need for a collapsible, selectively deployable material deflection apparatus adapted for directing into a predetermined receptacle material (e.g., mail pieces) discharged from a discharge chute.

SUMMARY

In a typical embodiment, a deflector plate system includes a base frame adapted for one of permanent and removable dependence from the main framework supporting a material-guiding discharge chute. Reciprocably depending from the base frame is a deflector-plate support structure adapted for rearward and forward reciprocating motion with respect to the base frame along a reciprocation axis between a rearwardmost retracted position and a forwardmost extended position. Variations of a deflector-plate support structure include laterally spaced right and left, elongated frame members extending along, but not necessarily parallel to, the reciprocation axis or to one another. Pivotably attached to the right and left frame members are, respectively, right side and left side deflector plates. Each side deflector plate pivots about a side-plate pivot axis extending along, but not necessarily parallel to, the respective one of the right and left frame members from which that side deflector plate depends and along, but not necessarily parallel to, the reciprocation axis. Moreover, each side deflector plate includes an inner face, and outer face, a base edge, a distal edge opposite the base edge, and rear and front edges, the base edge being the edge, as between the base and distal edges, that is closer to the side-plate pivot axis.

In various embodiments, a front deflector plate pivotally depends from each of the right and left side plates. Each of the right and left front plates is pivotable about a front-plate pivot axis extending along the front edge of the side plate from which that front plate depends. Each front plate includes an inside face, an outside face, a base edge, a distal edge opposite the base edge, and upper and lower edges, the base edge being the edge, as between the base and distal edges, that is closer to the front-plate pivot axis.

In still additional embodiments, a rear or tail deflector plate pivotably depends from each of the right and left side plates. Each of the right and left tail plates is pivotable about a tail-plate pivot axis extending along the rear edge of the side plate from which that tail plate depends. Each tail plate includes an interior face, an exterior face, a base edge that extends along the tail-plate pivot axis, a top edge, and bottom edge and, depending on whether the tail plate includes more than three edges, a distal edge opposite the base edge. In an embodiment in which a tail plate includes only three edges, the tail plate is triangular with the top and bottom edges meeting at angle opposite the base edge of the tail plate. The reason for the inclusion of triangular tail plates in various embodiments will be more fully explained in the detailed description below.

In an illustrative environment, the base frame of the deflector plate system is either removably or permanently attached to a framework such that the base frame is disposed underneath the forwardly declining surface of a material-guiding chute. Typically, such a chute further includes material-guiding side walls depending upwardly from the forwardly declining surface and a material discharge (or drop-off) edge defining the terminus of the forwardly declining surface. The deflector plate system is selectively positionable into alternative storage and operative attitudes or states.

An illustrative storage attitude is one in which the deflector plates are collapsed and the deflector-plate support structure has been urged rearwardly toward its rearwardmost position with respect to the base frame. In the illustrative environment in which the base frame is disposed underneath the forwardly declining surface of a material-guiding chute, the deflector plates are sufficiently collapsible so as to assume a profile low enough to clear the material discharge edge of the chute as the deflector-plate support structure is urged toward its rearwardmost position. A storage attitude is, furthermore, typically one in which the deflector-plate support structure is sufficiently retracted that at least a majority portion of the length of each collapsed right and left side plate is disposed rearwardly of the chute discharge edge. In various embodiments, the side and front plates are planar and collapsible to such an extent that one of (i) at least a portion of the inside face of a front plate is overlayingly juxtaposed (e.g., overlapped, but not necessarily in contacting engagement) with a portion of the inner face of the side plate with which it is pivotably attached and (ii) at least a portion of the outside face of a front plate is overlayingly juxtaposed with a portion of the outer face of the side plate with which it is pivotably attached. In at least some versions further including tail plates, the tail plates are planar and collapsible to such an extent that one of (i) at least a portion of the interior face of a tail plate is overlayingly juxtaposed with a portion of the inner face of the side plate with which it is pivotably attached and (ii) at least a portion of the exterior face of a tail plate is overlayingly juxtaposed with a portion of the outer face of the side plate with which it is pivotably attached. "Overlaying juxtaposition" includes not only an overlying relationship with or without actual contacting engagement, but also a relationship in which two plates at least partially overlie and are separated by one or more intermediate plates. For instance, one or more embodiments is possible in which a side plate, front plate and tail plate are all of substantially the same length. If the front plate is folded over the side plate and then the tail plate is folded over the front plate, the faces of the side plate and tail plate closest to the front plate between them are still "overlayingly juxtaposed" with one another. Additionally, it would not be inconsistent with the intended meaning of "overlayingly juxtaposed" to characterize the inside of the front cover of a closed 300-page book as being overlayingly juxtaposed with the inside of the back cover of the book. A collapsed position is, furthermore, typically characterized in that the right and left side plates are pivoted inwardly toward one another such that their distal edges are brought into relatively close proximity to one another, although, it is to be understood, that embodiments in which the side plates are collapsed by pivoting them outwardly away from one another are within the scope and contemplation of the invention.

In order to bring a typically embodied and situated deflector plate system from a storage attitude to an operative attitude, a user first draws the deflector-plate support structure forwardly toward himself or herself until at least the rear edges of the right and left side plates are forward of the chute discharge edge. The user then pivots the side plates from their relatively horizontal positions to more upright positions in which the distal edges of the side plates are higher than the discharge edge of the chute. Once the side plates are sufficiently upright, the front plates can be pivoted such that they extend toward one another. In a typical embodiment, the front plates depending from the right and left side plates are selectively coupleable and, when coupled, combine to form a "backstop" to prevent the overshooting of material exiting the chute. In alternative embodiments, a single front plate pivotably depending from one of the right and left side plates is selectively coupleable to the other of the first and second side plates to serve as the backstop. The upright side plates serve to deflect mail pieces that exit the discharge chute at sidewise angles sufficiently large that such mail pieces would otherwise miss the receptacle below the chute.

In embodiments including tail plates, the tail plates are pivoted from a folded position toward the chute. In various versions, each tail plate includes an edge that inclines as it extends rearwardly of the tail plate base edge. The rearward inclination of the edge facilitates the extension of the tail plate rearward of the chute discharge edge and along the sloped chute surface. If the material-guiding side walls of the chute are spaced at a greater distance than the side plates of the deflector plate system, the tail plates of a typical version can be angled so as to diverge rearwardly with respect to one another into the chute to channel material that slides down the sloped surface of the chute near one of the material-guiding side walls into the area defined inside the side and front plates of the deflector plate system.

In various implementations, when the deflector plates are in a deployed state, the base edges of the side plates and the lower edge of the at least one front plate combine with the discharge edge of the chute, as viewed from above, to define an open "material acceptance region" through which material can descend to a predetermined location below the acceptance region. A receptacle situated below the acceptance region should have a perimeter extending to the outside of the acceptance region in all directions to ensure that material that descends through the acceptance region settles in the receptacle. As shown in illustrative embodiments in the drawings, the deflector plates in various embodiments are sloped when deployed so as to facilitate "funneling" of material into the acceptance region.

In still further embodiments, the base frame is mounted for pivotable motion about a vertically extending axis such that the deflector-plate support structure can be pivoted clockwise and counterclockwise along a horizontal plane.

Representative embodiments of the invention are more completely described and depicted in the following detailed description and the accompanying drawings.

DETAILED DESCRIPTION

The following description of various embodiments of a material sortation deflector plate system is illustrative in nature and is therefore not intended to limit the scope of the invention or its application of uses.

Figure 1:
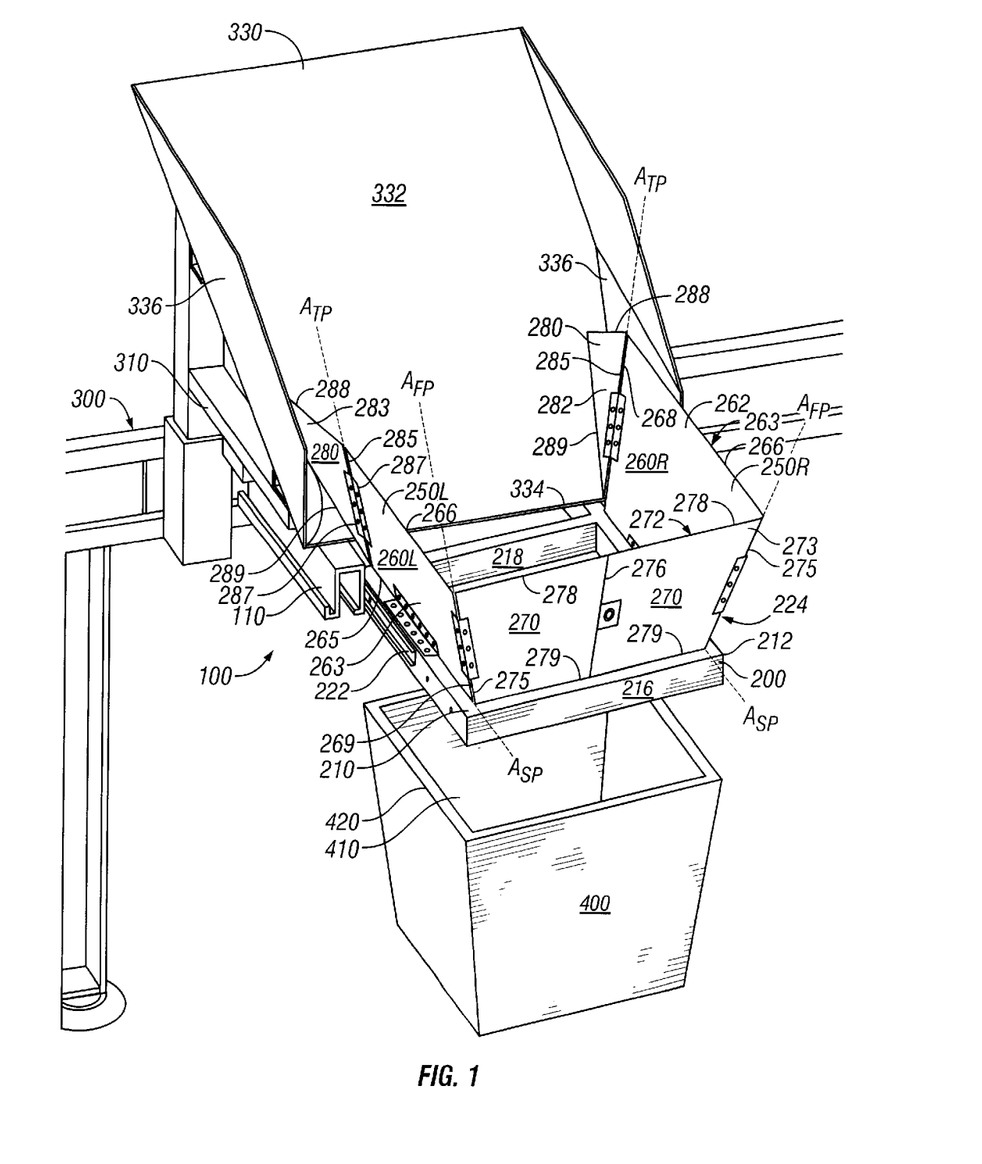
FIG. 1 depicts an illustrative material sortation deflector plate system in an operative attitude with left and right sets of deflector plates in a deployed state.

Referring to FIG. 1, an illustrative deflector plate system 100 includes a base frame 110 mounted to the main framework 300 supporting a material-guiding discharge chute 330. The base frame 110 is mounted such that it is underneath the forwardly declining surface 332, and extends rearwardly of the discharge edge 334, of the chute 330.

A deflector-plate support structure 200 reciprocably depends from the base frame 110 and is adapted for rearward and forward reciprocating motion with respect to the base frame 110 between a rearwardmost retracted position and a forwardmost extended position. The illustrative embodiment of FIGS. 1 through 5 includes a deflector-plate support structure 200 having laterally spaced left and right elongated frame members 210 and 212 and front and rear transverse beams 216 and 218 extending between and bridging the left and right frame members 210 and 212. In the particular embodiment illustrated, left and right slides 222 and 224 interconnect the base frame 110 and the deflector-plate support structure 200 and facilitate the reciprocating motion of the deflector-plate support structure 200 with respect to the base frame 110. The slides 222 and 224 depicted resemble drawer slides and are similar in operation, although the deflector-plate support structure 200 can be alternatively mounted for rearward and forward reciprocal motion, as the specific manner in which the deflector-plate support structure 200 is made to reciprocably depend from the base frame 110 is of no particular relevance.

A first deflector plate set 250L pivotably depends from the left elongated frame member 210 and a second deflector plate set 250R pivotably depends from the right elongated frame member 212. The first deflector plate set 250L includes a left side deflector plate 260L by which the first deflector plate set 250L is hingedly attached to the left frame member 210 for pivotal motion about a first side-plate pivot axis $A_{SP}$ extending along the left frame member 210. Analogously, the second deflector plate set 250R includes a right side deflector plate 260R by which the second deflector plate set 250R is hingedly attached to the right frame member 212 for pivotal motion about a second side-plate pivot axis $A_{SP}$ extending along the right frame member 212. Each of the left and right side deflector plates 260L and 260R includes an inner face 262, an outer face 263, a base edge 265, a distal edge 266 opposite the base edge 265, and rear and front edges 268 and 269, the base edge 265 being the edge, as between the base and distal edges 265 and 266, that is closer to the side-plate pivot axis $A_{SP}$.

Figure 2:
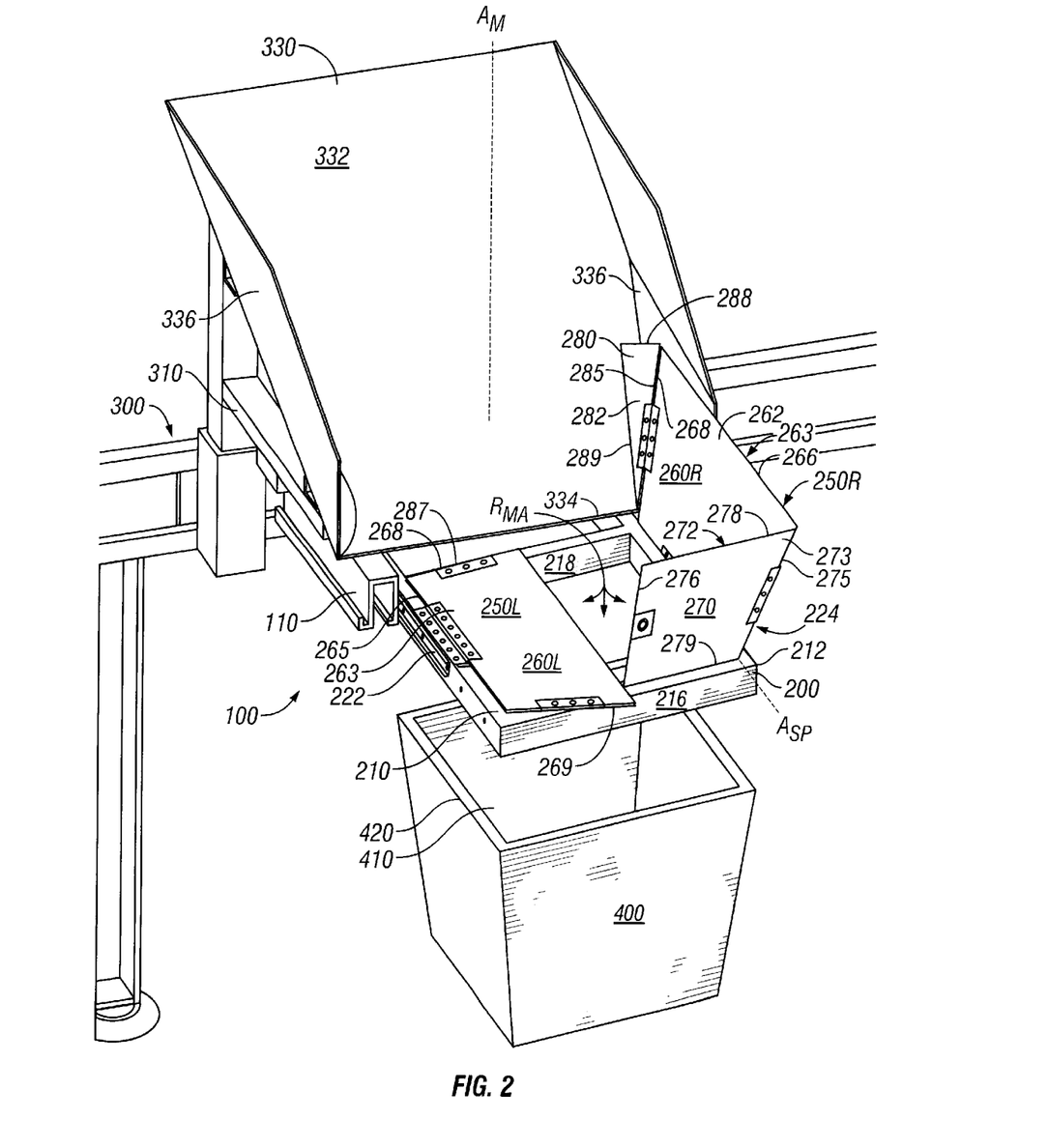
FIG. 2 shows the deflector plate system of FIG. 1 in which the left set of deflector plates is in a collapsed position.

As shown in FIGS. 1 and 2, a front deflector plate 270 hingedly depends from each of the left and right side plates 260L and 260R. Each front deflector plate 270 is pivotable about a front-plate pivot axis $A_{FP}$ that extends along the front edge 269 of the respective one of the left and right side plates 260L and 260R from which it depends. Each front plate 270 includes an inside face 272, an outside face 273, a base edge 275, a distal edge 276 opposite the base edge 275, and upper and lower edges 278 and 279, the base edge 275 being the edge, as between the base edge 275 and distal edge 276, that is closer to the front-plate pivot axis $A_{FP}$ and to the front edge 269 of the side plate 260L or 260R to which it is pivotably attached.

As depicted in FIGS. 1 and 2, each of the first and second deflector plate sets 250L and 250R of the illustrative embodiment further includes a tail plate 280 hingedly depending from each of the left and right side plates 260L and 260R. Each tail plate 280 is triangular and includes an interior face 282, an exterior face 283, a base edge 285, a top edge 288 and a rearwardly-inclining bottom edge 289, and is pivotable about a tail-plate pivot axis $A_{TP}$ extending along the rear edge 268 of the side plate 260L or 260R from which it depends and the base edge 285 of the tail plate 280. In alternative versions including a rearwardly-inclining edge, the tail plate 280 includes more than three sides. For instance, it will be readily appreciated that a four-sided tail plate could include a relatively horizontal edge connecting the base edge to a rearwardly-inclining rear edge or a rearwardly-inclining edge connecting the base edge to the lower end of a relatively vertical rear edge, by way of non-limiting example. In any event, regardless of the particular geometry of the tail plates, it is advantageous for at least some versions to include at least one rearwardly-inclining edge for reasons made apparent with the aid of the drawings and, in particular, FIGS. 1 and 2.

FIGS. 1 through 4 depict an illustrative embodiment in operative (FIG. 1), storage (FIG. 4) and intermediate (FIGS. 2 and 3) attitudes in a selected portion of a representative material sorting environment. Following is a detailed explanation of the depictions appearing in each of FIGS. 1 through 4 in order to facilitate an appreciation of the use and operation of a typical embodiment. In each of FIGS. 1 through 4, a deflector plate system 100 is shown with its base frame 110 mounted to a framework 300 for retention underneath the forwardly declined surface 332 of a material-guiding chute 330. The forwardly declined surface 332 terminates at a laterally extending material discharge edge 334. The chute 330 further includes left and right material-guiding side walls 336 extending upwardly from the forwardly declined surface 332 to retain material descending down the chute 330 on the forwardly declined surface 332 until it drops off the discharge edge 334. Situated below the material acceptance region $R_{MA}$ (See FIG. 2) defined by the deflector plate system 100 is a receptacle 400 having an open top end 410 defined by a perimeter 420. Because the operation of the deflector plate system 100 can be more clearly explained by starting with a storage attitude and progressing to an operative attitude, FIGS. 1 through 4 are discussed, for the most part, in reverse-chronological order, although intermittent references are made to other figures when, for instance, components under discussion are not depicted in the primary figure presently under discussion.

Figure 4:
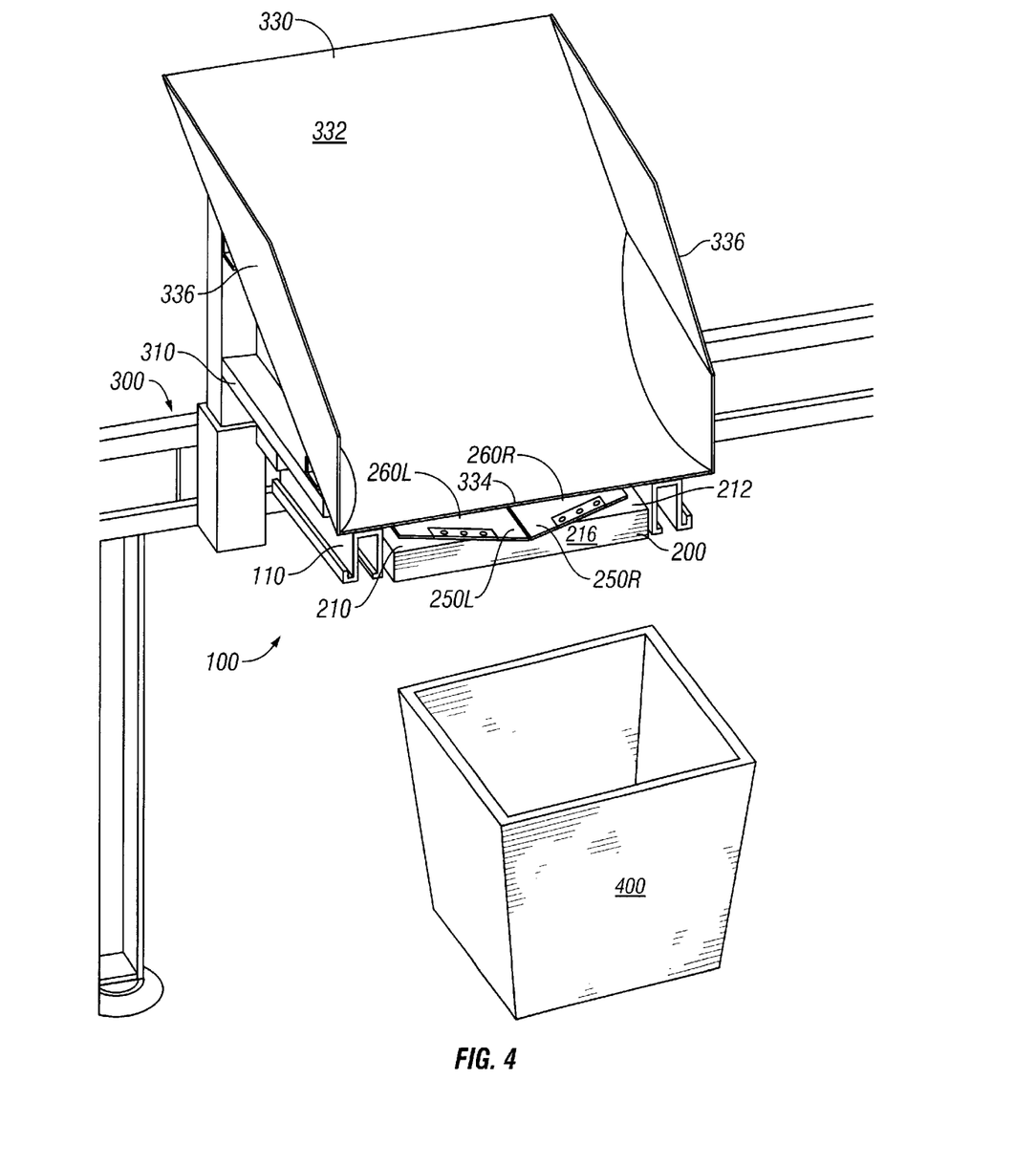
FIG. 4 depicts the illustrative deflector plate system of FIGS. 1 through 3 in which the deflector-plate support structure from which the plate sets depend in a retracted, storage position.

Referring to 4, in an illustrative storage attitude, the first and second deflector plate sets 250L and 250R are collapsed and the deflector-plate support structure 200 is in a rearward position more toward its rearwardmost position than its forwardmost position with respect to the base frame 110. A storage attitude is, furthermore, typically characterized in that the deflector-plate support structure 200 is retracted to such an extent that at least a majority portion of the length of each collapsed left and right side plate 260L and 260R is disposed rearwardly of the chute discharge edge 334. Although not all plate faces referred to are viewable in FIG. 4, one will readily appreciate upon examination of all of the figures collectively that the side plates 260L and 260R and the front and tail plates 270 and 280 are planar and that, when collapsed, the inside face 272 of each front plate 270 is in overlaying juxtaposition with a portion of the inner face 262 of the side plate 260L or 260R from which that front plate 270 hingedly depends. Similarly, the tail plates 280 are collapsed to such an extent that the interior face 282 of each tail plate 280 is in overlaying juxtaposition with a portion of the inner face 262 of the side plate 260L or 260R from which that tail plate 280 hingedly depends. As previously stated in the summary section, a collapsed position is typically one in which the left and right side plates 260L and 260R are pivoted inwardly toward one another such that their distal edges 266 are brought into relatively close proximity to one another as shown in FIG. 4. In the particular embodiment depicted, and as most clearly illustrated in FIG. 2, the collapsed first and second plate sets 250L and 250R are supported by front and rear transverse beams 216 and 218 extending between and bridging the left and right frame members 210 and 212 of the deflector-plate support structure 200.

Figure 3:
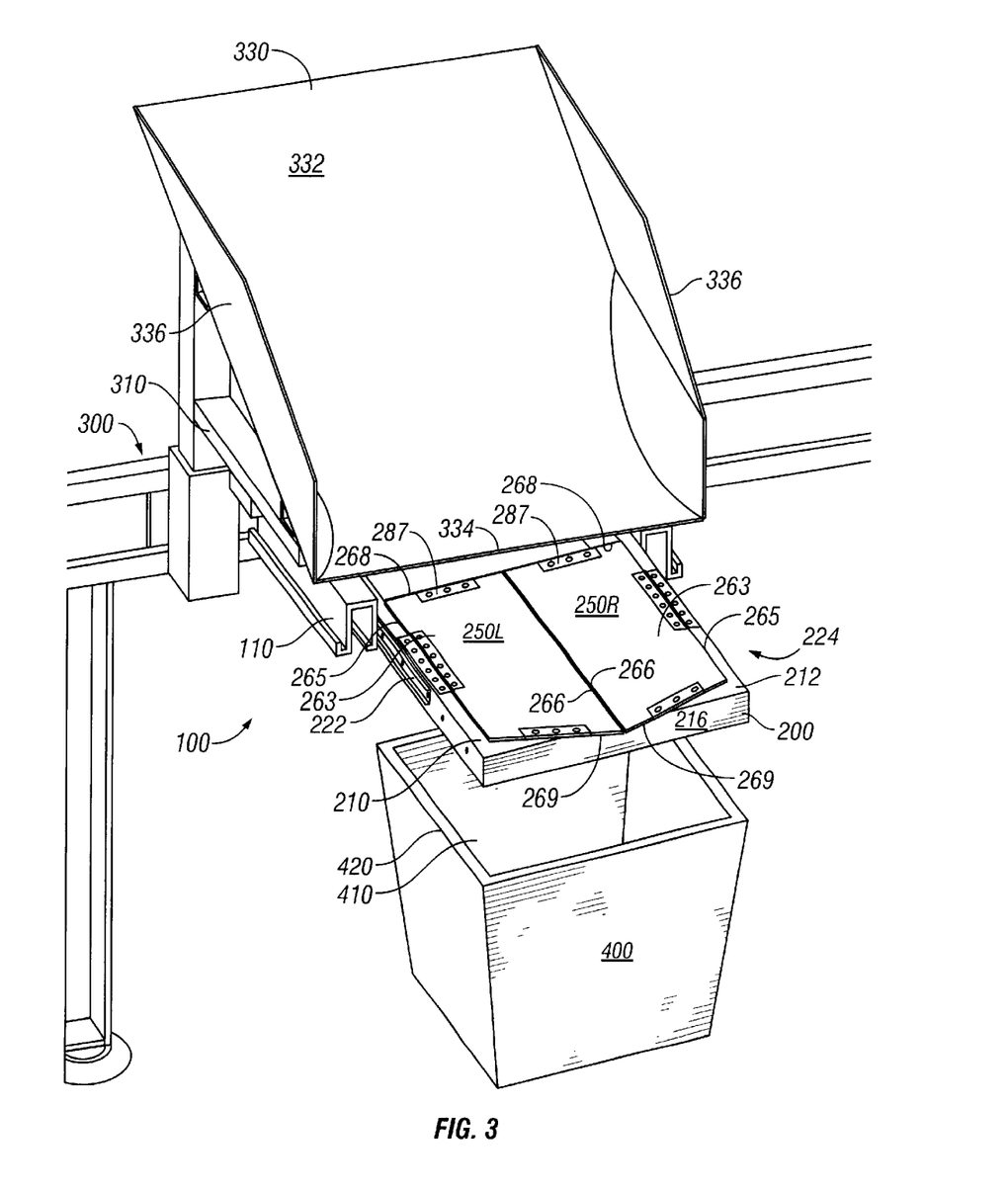
FIG. 3 shows the deflector plate system of FIGS. 1 and 2 in which the left and right sets of deflector plates is in a collapsed state.

According to one method of deployment, the illustrative deflector plate system 100 of FIGS. 1 through 4 is brought from a storage attitude to an operative attitude by a user's first drawing the deflector-plate support structure 200 forward sufficiently far to permit the pivoting to a relatively upright position of the first and second deflector plate sets 250L and 250R without interference from the chute 330. For instance, in the illustrative embodiment depicted in the drawings, the deflector-plate support structure 200 is sufficiently far forward to deploy the deflector plate sets 250L and 250R when the rear edges 268 of the left and right side plates 260L and 260R, the base edges 285 of the tail plates 280, and any hardware extending rearwardly of the edges 268 and 285 (e.g., tail plate hinges 287) are forward of the chute discharge edge 334, as shown in FIG. 3. As shown in FIGS. 2 and 1, the user then pivots the side plates 260L and 260R from their relatively horizontal positions to more upright positions in which the distal edges 266 of the side plates 260L and 260R are higher than the discharge edge 334 of the chute 330. Once the side plates 260L and 260R are sufficiently upright, the front plates 270 are pivoted such that they extend toward one another. As shown in FIG. 1, the front plates 270 are selectively coupleable and, when coupled, combine to form a "backstop" to prevent the overshooting of material exiting the chute 330. The front plates 270 may be alternatively coupled by any of a variety of devices including, for example, one or more screws, bolt and nut sets, pins, latches, overlapping tabs, clips and/or snaps, the specific fastener being of no particular relevance as long as it facilitates "selective coupling." In addition, FIG. 1 shows that the front transverse beam 216 supports the selectively coupled front plates 270.

Following the coupling of the front plates 270, the tail plates 280 are pivoted from a folded position toward the chute 330. The rearwardly inclined edge 289 of each tail plate 280 permits the extension of each tail plate 280 beyond and rearward of the chute discharge edge 334 and along the sloped chute surface 332. If the material-guiding side walls 336 of the chute 330 are spaced at a greater distance than the side plates 260L and 260R of the deflector plate system 100, the tail plates 280 can be angled so as to diverge rearwardly with respect to one another and project into the chute 330 in order to channel material that slides down the forwardly declined surface 332 of the chute 330 near one of the material-guiding side walls 336 into the material acceptance region $R_{MA}$ defined inside the side and front plates 260L, 260R and 270 of the deflector plate system 100. For instance, in the illustrative embodiment as depicted in FIG. 2, a material acceptance region $R_{MA}$ exists within the boundary defined by the side plate base edges 265, the front plate lower edges 279 and the discharge edge 334 of the chute 330. In this particular embodiment, a rectangular acceptance region $R_{MA}$ is defined within the aforementioned boundary by the left and right frame members 210 and 212 and the front and rear transverse beams 216 and 218 extending between the left and right frame members 210 and 212.

In alternative embodiments, including the illustrative embodiment of FIGS. 1 through 4, the base frame 110 of the deflector plate system 100 is mounted to the framework 300 such that the deflector plate system 100 is pivotable about a vertically extending mount axis $A_M$. As shown in FIG. 2, the deflector plate support structure 200 is disposed at an acute angle with respect to the discharge edge 334 to illustrate the capacity of the deflector plate system 100 to be angularly displaced along a horizontal plane.

Figure 5:
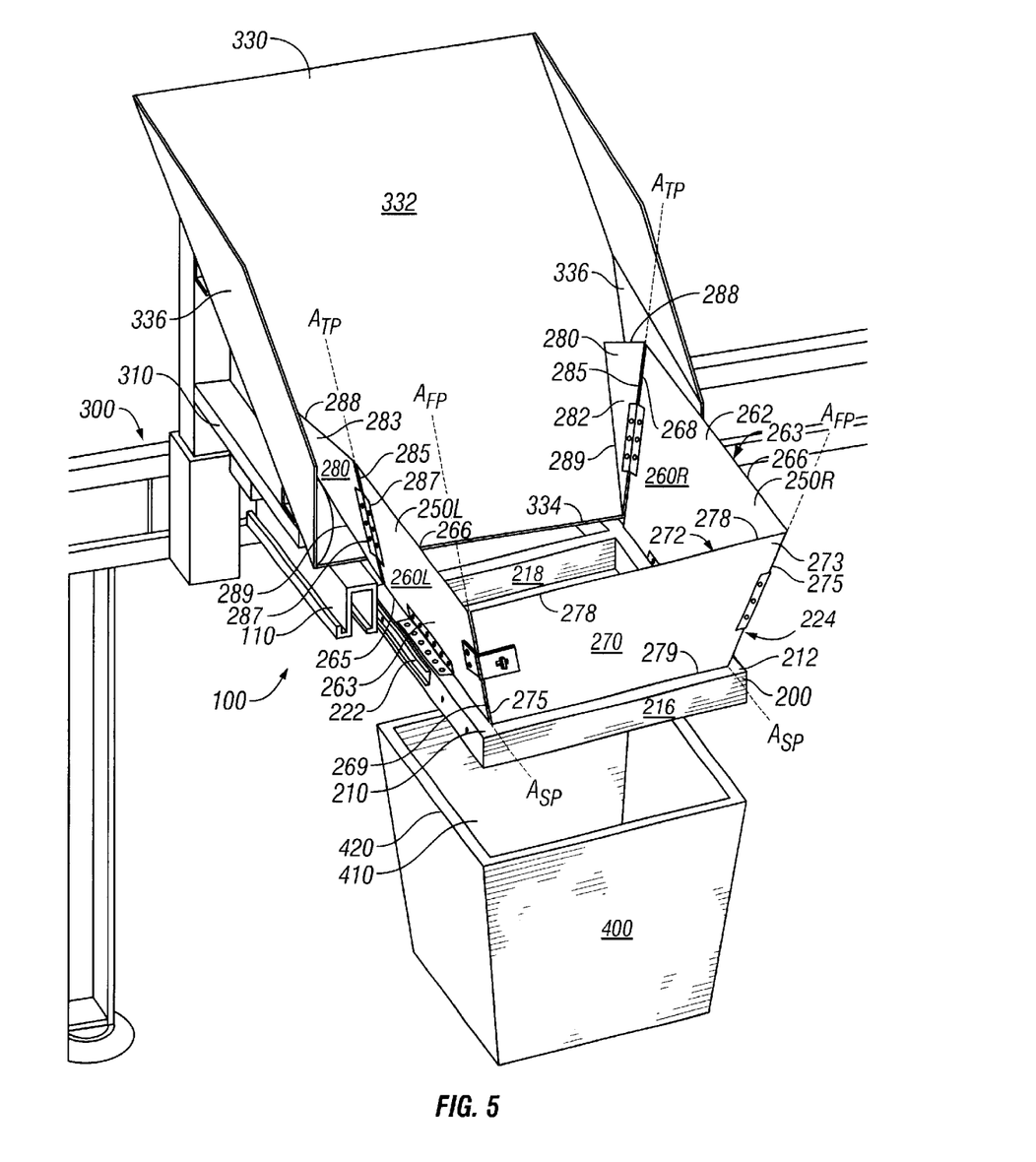
FIG. 5 depicts an embodiment having a single front plate hingedly depending from the right side plate and extending laterally toward the left side plate to which it is selectively coupleable.

Referring to FIG. 5, an alternative embodiment of a deflector plate system 100 includes, instead of a front deflector plate 270 depending from each of the left and right side plates 260L and 260R, a single front deflector plate 270 hingedly depending from only one of the left and right side plates 260L and 260R. In the particular version of FIG. 5, the single front deflector plate 270 depends from the right side plate 260R and extends laterally toward the left side plate 260L. As illustrated, when the left and right side plates 260L and 260R are in upright positions, the front deflector plate 270 is selectively coupleable with the side plate opposite the side plate from which the front deflector plate 270 depends. In the particular case of FIG. 5, because the front deflector plate 270 depends from the right side plate 260R, the front deflector plate 270 extends toward, and is selectively coupleable with, the left side plate 260L. The single front deflector plate 270 includes edges and faces analogous to those of the front deflector plates 270 depending from each of the left and right side plates 260L and 260R in the alternative versions previously described, as indicated by like reference numbers. Moreover, versions like the version of FIG. 5 function in all material respects similarly to the versions including two front deflector plates 270. Accordingly, no further discussion of versions including a single front deflector plate 270 is necessary.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A material deflector plate system comprising:

a base frame;

a deflector-plate support structure depending from the base frame and being adapted for rearward and forward reciprocating motion with respect to the base frame along a reciprocation axis between a rearwardmost retracted position and a forwardmost extended position; and first and second deflector plate sets, the first deflector plate set including at least a left side deflector plate hingedly attached to the deflector plate support structure for pivotable motion about a first side-plate pivot axis that extends along the reciprocation axis and the second deflector plate set including at least a right side deflector plate hingedly attached to the deflector plate support structure for pivotable motion about a second side-plate pivot axis that extends along the reciprocation axis, each of the left and right side deflector plates including an inner face, an outer face, a base edge, a distal edge opposite the base edge, and rear and front edges, the base edge being the edge, as between the base and distal edges, that is closer to the side-plate pivot axis about which that side plate pivots, each of the left and right side plates being pivotable between a collapsed position in which the side plate extends along a horizontal plane and a deployed position in which the side plate is relatively upright, the first and second sideplate pivot axes being spaced apart such that, at least when the left and right side plates are in upright positions, there exists between the base edges of the left and right side plates an open material acceptance region through which material can descend to a predetermined location below the acceptance region.

2. The deflector plate system of claim 1 wherein the deflector plate support structure comprises elongated, laterally spaced left and right frame members that extend along the reciprocation axis and to which the left side plate of the first deflector plate set and the right side plate of the second deflector plate set are respectively hingedly attached.

3. The deflector plate system of claim 2 wherein the first deflector plate set further comprises a front deflector plate hingedly depending from the left side deflector plate and the second deflector plate set further comprises a front deflector plate hingedly depending from the right side deflector plate, each front plate including an inside face, an outside face, a base edge, a distal edge opposite the base edge, and upper and lower edges, each front deflector plate being pivotable about a front-plate pivot axis extending along the base edge of that front deflector plate and along the front edge of the respective one of the left and right side plates from which that front plate hingedly depends.

4. The deflector plate system of claim 3 wherein (i) the front plates are selectively coupleable to one another when the deflector plate system is in a deployed attitude in which the left and right side plates are sufficiently upright that the front plates can be pivoted to extend toward one another for coupling, and (ii) the first and second deflector plate sets are collapsible such that the side plates are pivoted inwardly toward one another with the upper edges of the side plates closer to one another than the upper edges of the side plates are when the side plates are in an upright deployed position and, with respect to each front plate, such that one of (a) at least a portion of the inside face of that front plate is overlayingly juxtaposed with a portion of the inner face of the side plate with which that front plate is hingedly attached and (b) at least a portion of the outside face of that front plate is overlayingly juxtaposed with a portion of the outer face of the side plate with which that front plate is hingedly attached.

5. The deflector plate system of claim 4 wherein the base frame is adapted for one of permanent and removable mounting to a framework supporting a material-guiding discharge chute having a forwardly declining surface terminating in a material discharge edge such that the base frame of the deflector plate system is underneath the forwardly declining surface and extends rearwardly of the discharge edge, and wherein the deflector plate system can alternatively assume storage and operative attitudes such that, when the base frame is so mounted, a storage attitude is one in which the first and second deflector plate sets are collapsed and the deflector plate support structure is retracted to such an extent that at least a majority portion of the length of each of the left and right side plates is disposed rearwardly of the chute discharge edge and an operative attitude is one in which the deflector-plate support structure is drawn sufficiently far forward with respect to the base frame to permit pivoting of the left and right side plates from relatively horizontal storage positions to more upright positions in which the distal edges of the side plates are higher than the discharge edge of the chute and in which the left and right side plates are positioned in such upright positions.

6. The deflector plate system of claim 5 wherein the base frame is further mountable to a framework such that the deflector plate system is pivotable about a vertically extending mount axis for angular displacement along a horizontal plane.

7. The deflector plate system of claim 3 wherein the first deflector plate set further comprises a tail plate hingedly depending from the left side deflector plate and the second deflector plate set further comprises a tail plate hingedly depending from the right side deflector plate, each tail plate including an interior face, an exterior face, a base edge, a top edge and at least one of (i) a bottom edge and (ii) a rear edge, each tail plate being pivotable about a tail-plate pivot axis extending along the base edge of that tail plate and along the rear edge of the side plate from which that tail plate hingedly depends.

8. The deflector plate system of claim 7 wherein the first and second deflector plate sets are collapsible such that the side plates are pivoted inwardly toward one another with the upper edges of the side plates closer to one another than the upper edges of the side plates are when the side plates are in an upright deployed position and, with respect to each tail plate, such that one of (i) at least a portion of the interior face of the tail plate is overlayingly juxtaposed with a portion of the inner face of the side plate with which that tail plate is hingedly attached and (ii) at least a portion of the exterior face of the tail plate is overlayingly juxtaposed with a portion of the outer face of the side plate with which that tail plate is hingedly attached.

9. The deflector plate system of claim 8 wherein (i) the front plates are selectively coupleable to one another when the deflector plate system is in a deployed attitude in which the left and right side plates are sufficiently upright that the front plates can be pivoted to extend toward one another for coupling, and (ii) the first and second deflector plate sets are collapsible such that the side plates are pivoted inwardly toward one another with the upper edges of the side plates closer to one another than the upper edges of the side plates are when the side plates are in an upright deployed position and, with respect to each front plate, such that one of (a) at least a portion of the inside face of that front plate is overlayingly juxtaposed with a portion of the inner face of the side plate with which that front plate is hingedly attached and (b) at least a portion of the outside face of that front plate is overlayingly juxtaposed with a portion of the outer face of the side plate with which that front plate is hingedly attached.

10. The deflector plate system of claim 7 wherein (i) the front plates are selectively coupleable to one another when the deflector plate system is in a deployed attitude in which the left and right side plates are sufficiently upright that the front plates can be pivoted to extend toward one another for coupling, and (ii) the first and second deflector plate sets are collapsible such that the side plates are pivoted inwardly toward one another with the upper edges of the side plates closer to one another than the upper edges of the side plates are when the side plates are in an upright deployed position and, with respect to each front plate, such that one of (a) at least a portion of the inside face of that front plate is overlayingly juxtaposed with a portion of the inner face of the side plate with which that front plate is hingedly attached and (b) at least a portion of the outside face of that front plate is overlayingly juxtaposed with a portion of the outer face of the side plate with which that front plate is hingedly attached.

11. The deflector plate system of claim 10 wherein the base frame is adapted for mounting to a framework supporting a material-guiding discharge chute having a forwardly declining surface terminating in a material discharge edge such that the base frame of the deflector plate system is underneath the forwardly declining surface and extends rearwardly of the discharge edge, and wherein the deflector plate system can alternatively assume storage and operative attitudes such that, when the base frame is so mounted, a storage attitude is one in which the first and second deflector plate sets are collapsed and the deflector plate support structure is retracted to such an extent that at least a majority portion of the length of each of the right and left side plates is disposed rearwardly of the chute discharge edge and an operative attitude is one in which the deflector-plate support structure is drawn sufficiently far forward with respect to the base frame to permit pivoting of the left and right side plates from relatively horizontal storage positions to more upright positions in which the distal edges of the side plates are higher than the discharge edge of the chute and in which the left and right side plates are positioned in such upright positions.

12. The deflector plate system of claim 11 wherein the base frame is further mountable to a framework such that the deflector plate system is pivotable about a vertically extending mount axis for angular displacement along a horizontal plane.

13. The deflector plate system of claim 11 wherein each tail plate includes a rearwardly inclined edge that permits the extension of that tail plate rearward of the discharge edge of the chute for projection into the chute along the forwardly declined chute surface, when the deflector plate system is in an operative attitude, in order to channel material that slides down the forwardly declined chute surface into the material acceptance region.

14. The deflector plate system of claim 1 wherein the base frame is adapted for mounting to a framework supporting a material-guiding discharge chute having a forwardly declining surface terminating in a material discharge edge such that the base frame of the deflector plate system is underneath the forwardly declining surface and extends rearwardly of the discharge edge, and wherein the deflector plate system can alternatively assume storage and operative attitudes such that, when the base frame is so mounted, a storage attitude is one in which the first and second deflector plate sets are collapsed and the deflector plate support structure is retracted to such an extent that at least a majority portion of the length of each of the left and right side plates is disposed rearwardly of the chute discharge edge and an operative attitude is one in which the deflector-plate support structure is drawn sufficiently far forward with respect to the base frame to permit pivoting of the left and right side plates from relatively horizontal storage positions to more upright positions in which the distal edges of the side plates are higher than the discharge edge of the chute and in which the left and right side plates are positioned in such upright positions.

15. The deflector plate system of claim 14 wherein the base frame is further mountable to a framework such that the deflector plate system is pivotable about a vertically extending mount axis for angular displacement along a horizontal plane.

16. A material deflector plate system comprising:
a base frame;
a deflector-plate support structure depending from the base frame and being adapted for rearward and forward reciprocating motion with respect to the base frame along a reciprocation axis between a rearwardmost retracted position and a forwardmost extended position, the deflector-plate support structure having laterally spaced left and right frame members extending along the reciprocation axis; and first and second deflector plate sets, the first deflector plate set including a left side deflector plate hingedly attached to the left frame member for pivotal motion about a first side-plate pivot axis that extends along the left frame member and the second deflector plate set including a right side deflector plate hingedly attached to the right frame member for pivotable motion about a second side-plate pivot axis that extends along the right frame member, each of the left and right side deflector plates including an inner face, an outer face, a base edge, a distal edge opposite the base edge, and rear and front edges, the base edge being the edge, as between the base and distal edges, that is closer to the side-plate pivot axis about which that side plate pivots, each of the first and second deflector plate sets further including (i) a front deflector plate hingedly depending from the side deflector plate and being pivotable about a front-plate pivot axis extending along the front edge of the side deflector plate, the front plate including an inside face, an outside face, a base edge, a distal edge opposite the base edge, and upper and lower edges, the base edge being the edge, as between the base and distal edges, that is closer to the front-plate pivot axis, and (ii) a tail plate hingedly depending from the side deflector plate and including an interior face, an exterior face, a base edge, a top edge and at least one of (a) a bottom edge and (b) a rear edge, the tail plate being pivotable about a tail-plate pivot axis extending along the base edge of the tail plate and along the rear edge of the side deflector plate.

17. The deflector plate system of claim 16 wherein the deflector plate system is selectively settable into alternative operative and storage attitudes and wherein (i) an operative attitude is one in which the first and second deflector plate sets are in a deployed state in which the left and right side deflector plates are sufficiently upright that the front plates can be pivoted to extend toward one another for selective coupling and the front plates are so coupled; and (ii) a storage attitude is one in which the side deflector plates have been pivoted inwardly toward one another such that the upper edges of the side deflector plates are closer to one another than the upper edges of the side deflector plates are when the side deflector plates are in an upright deployed state, and with respect to each front deflector plate, such that one of (a) at least a portion of the inside face of that front deflector plate is overlayingly juxtaposed with a portion of the inner face of the side deflector plate with which that front deflector plate is hingedly attached and (b) at least a portion of the outside face of that front deflector plate is overlayingly juxtaposed with a portion of the outer face of the side deflector plate with which that front deflector plate is hingedly attached, and with respect to each tail plate, such that one of (a) at least a portion of the interior face of the tail plate is overlayingly juxtaposed with a portion of the inner face of the side deflector plate with which that tail plate is hingedly attached and (b) at least a portion of the exterior face of the tail plate is overlayingly juxtaposed with a portion of the outer face of the side deflector plate with which that tail plate is hingedly attached.

18. The deflector plate system of claim 17 wherein the base frame is adapted for one of permanent and removable mounting to a framework supporting a material-guiding discharge chute having a forwardly declining surface terminating in a material discharge edge such that the base frame of the deflector plate system is underneath the forwardly declining surface and extends rearwardly of the discharge edge, and wherein the deflector plate system can alternatively assume storage and operative attitudes such that, when the base frame is so mounted, a storage attitude is one in which the first and second deflector plate sets are collapsed and the deflector plate support structure is retracted to such an extent that at least a majority portion of the length of each of the right and left side deflector plates is disposed rearwardly of the chute discharge edge and an operative attitude is one in which the deflector-plate support structure is drawn sufficiently far forward with respect to the base frame to permit pivoting of the left and right side deflector plates from relatively horizontal storage positions to more upright positions in which the distal edges of the side deflector plates are higher than the discharge edge of the chute and in which the left and right side plates are positioned in such upright positions.

19. The deflector plate system of claim 18 wherein each tail plate includes a rearwardly inclined edge that permits the extension of that tail plate rearward of the discharge edge of the chute for projection into the chute along the forwardly declined chute surface, when the deflector plate system is in an operative attitude, in order to channel material the slides down the forwardly declined chute surface into a material acceptance region defined between the left and right frame members of the deflector plate support structure.

20. The deflector plate system of claim 18 wherein the base frame is further mountable to a framework such that the deflector plate system is pivotable about a vertically extending mount axis for angular displacement along a horizontal plane.

21. A material deflector plate system comprising:
   a base frame;
   a deflector-plate support structure depending from the base frame and being adapted for rearward and forward reciprocating motion with respect to the base frame along a reciprocation axis between a rearwardmost retracted position and a forwardmost extended position;

first and second deflector plate sets, the first deflector plate set including at least a left side deflector plate hingedly attached to the deflector plate support structure for pivotable motion about a first side-plate pivot axis that extends along the reciprocation axis and the second deflector plate set including at least a right side deflector plate hingedly attached to the deflector plate support structure for pivotable motion about a second side-plate pivot axis that extends along the reciprocation axis, each of the left and right side deflector plates including an inner face, an outer face, a base edge, a distal edge opposite the base edge, and rear and front edges, the base edge being the edge, as between the base and distal edges, that is closer to the side-plate pivot axis about which that side plate pivots, each of the left and right side plates being pivotable between a collapsed position in which the side plate extends along a horizontal plane and a deployed position in which the side plate is relatively upright, the first and second side-plate pivot axes being spaced apart such that, at least when the left and right side plates are in upright positions, there exists between the base edges of the left and right side plates an open material acceptance region through which material can descend to a predetermined location below the acceptance region; and a front deflector plate hingedly depending from one of the left side deflector plate and the right side deflector plate, the front plate including an inside face, an outside face, a base edge, a distal edge opposite the base edge, and upper and lower edges, the front deflector plate being (i) pivotable about a front-plate pivot axis extending along the base edge of the front plate and along the front edge of the side plate from which the front plate depends and (ii) selectively coupleable to the side plate opposite the side plate from which the front plate hingedly depends when the left and right side plates are in upright positions.

* * * * *